United States Patent [19]

Kashimura et al.

[11] Patent Number: 5,157,481
[45] Date of Patent: Oct. 20, 1992

[54] REGISTRATION AND CONTOUR CORRECTION CIRCUIT AND METHOD FOR SOLID-STATE CAMERA

[75] Inventors: Naoki Kashimura; Kazuhiro Ban, both of Tokyo; Jun Hattori, Kawasaki; Yoshiro Aoyagi, Tokyo, all of Japan

[73] Assignee: Ikegami Tsushinki Co., Ltd., Tokyo, Japan

[21] Appl. No.: 810,360

[22] Filed: Dec. 18, 1991

Related U.S. Application Data

[63] Continuation of Ser. No. 604,012, Oct. 26, 1990.

[30] Foreign Application Priority Data

Nov. 9, 1989 [JP] Japan .................. 1-290098
Nov. 9, 1989 [JP] Japan .................. 1-290099

[51] Int. Cl.$^5$ .................. H04N 9/093; H04N 9/64
[52] U.S. Cl. .................. 358/51
[58] Field of Search .................. 358/37, 51, 41

[56] References Cited

U.S. PATENT DOCUMENTS 4,835,594  5/1989  Kihara .................. 358/51

FOREIGN PATENT DOCUMENTS 0059076  9/1982  European Pat. Off. .
0084195  7/1983  European Pat. Off. .
0176240  4/1986  European Pat. Off. .
0350794  1/1990  European Pat. Off. .
61-89791  5/1986  Japan .
2135851  9/1984  United Kingdom .

OTHER PUBLICATIONS

International Broadcasting Convention, IBC 80, Sep. 20–23, 1989, pp. 27–33, ii–xviii.

Primary Examiner—James J. Groody
Assistant Examiner—Kim Yen Vu
Attorney, Agent, or Firm—Spencer, Frank & Schneider

[57] ABSTRACT

A registration correction circuit for a solid-state camera having a plurality of solid-state image pickup elements. One of the color video signals produced from the image pickup elements is selected as a reference signal, and pixel data of the color video signals other than the reference signal are electronically moved so that the pixel data of all the color video signals will agree in their positions. Movement of pixels is carried out by using coordinate transformation and interpolation technique: the coordinate transformation is used to shift the pixels by a multiple of 1-pixel pitch; and the interpolation is used to shift the pixels by less than 1-pixel pitch. The spatial frequency components reduced by the interpolation calculations are adaptively enhanced for each pixel in real time.

18 Claims, 15 Drawing Sheets

SKEW
(HORIZONTAL DEFLECTION WAVEFORM
+ VERTICAL SAWTOOTH WAVEFORM)

H BOW
(HORIZONTAL DEFLECTION WAVEFORM
+ VERTICAL PARABOLIC WAVEFORM)

ROTATION
(VERTICAL DEFLECTION WAVEFORM
+ HORIZONTAL SAWTOOTH WAVEFORM)

V BOW
(VERTICAL DEFLECTION WAVEFORM
+ HORIZONTAL PARABOLIC WAVEFORM)

TOP TRAP

BOTTOM TRAP

LEFT TRAP

RIGHT TRAP

TOP PIN

BOTTOM PIN

LEFT PIN

RIGHT PIN

FIG.7A  FIG.7B        FIG.7C $$a = (1-m)*(1-n)$$
$$b = m * (1-n)$$
$$c = (1-m) * n$$
$$d = m * n$$

$$0 \leq m \leq 1, 0 \leq n \leq 1$$

FIG.8A        FIG.8B

| A<br>(1−a)<br>A'<br>(1−a') | B<br>(−b)<br>B'<br>(−b') |
|---|---|
| C'<br>(−c') | D'<br>(−d') |
| C<br>(−c) | D<br>(−d) |

$0 \leq m \leq 0.5, \ 0 \leq n \leq 0.5$

FIG. 10B

| a<br>(a') | b<br>(b') |
|---|---|
| c' | d' |
| c | d |

$a+b+c+d = 1$ (MOTION IMAGE)

$a'+b'+c'+d' = 1$ (STILL IMAGE)

$0 \leq a, b, c, d, a', b', c', d' \leq 1$

FIG. 10A

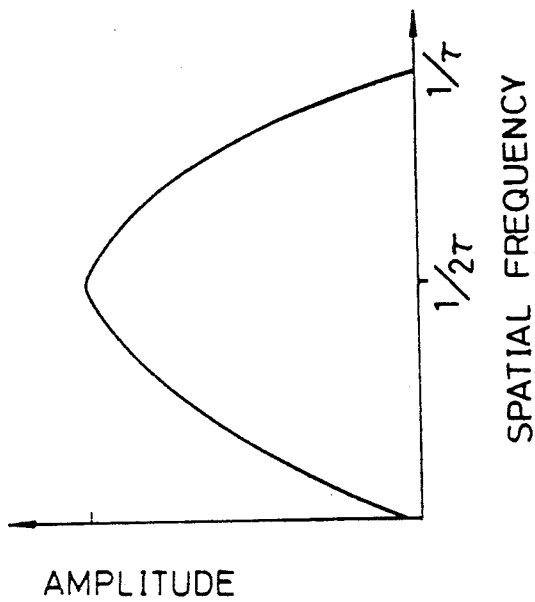
FIG.13B
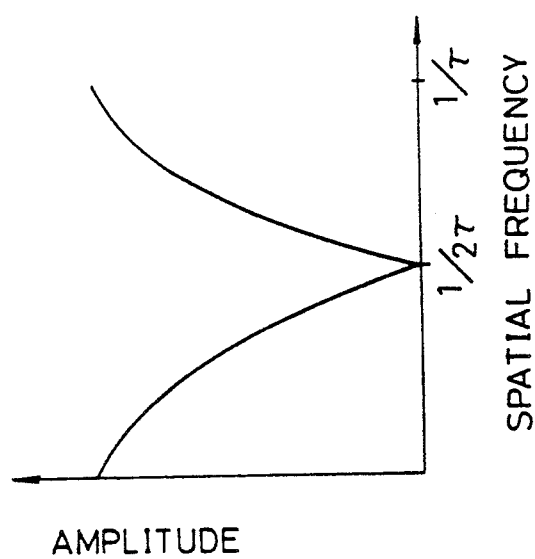
FIG.13A
FIG.14

$0 \leq m \leq 0.5, \ 0 \leq n \leq 0.5$

| A<br>(1−a) | B<br>(−b) |
|---|---|
| C<br>(−c) | D<br>(−d) |

FIG.15A $0.5 < m < 1, \ 0 \leq n \leq 0.5$

| A<br>(−a) | B<br>(1−b) |
|---|---|
| C<br>(−c) | D<br>(−d) |

FIG.15B $0 \leq m \leq 0.5, \ 0.5 < n < 1$

| A<br>(−a) | B<br>(−b) |
|---|---|
| C<br>(1−c) | D<br>(−d) |

FIG.15C $0.5 < m < 1, \ 0.5 < n < 1$

| A<br>(−a) | B<br>(−b) |
|---|---|
| C<br>(−c) | D<br>(1−d) |

FIG.15D

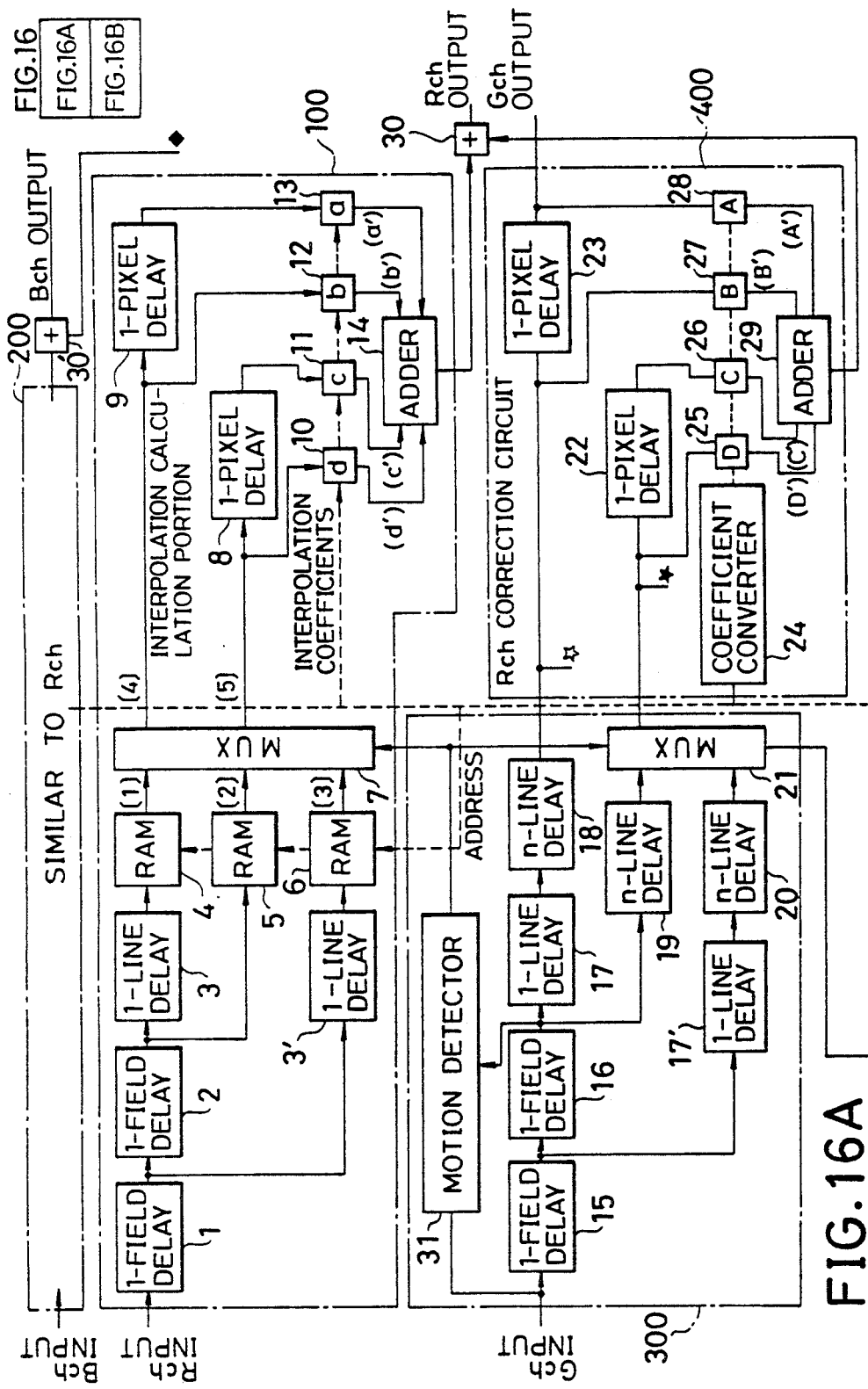

REGISTRATION AND CONTOUR CORRECTION CIRCUIT AND METHOD FOR SOLID-STATE CAMERA

This application is a continuation application Ser. No. 07/604,012, filed Oct. 26th, 1990.

BACKGROUND OF THE INVENTION

1. Field of the Invention

The present invention relates to a registration and contour correction circuit and method for a solid-state camera. More particularly, the present invention relates to a registration and contour correction circuit and method that can electrically perform the registration correction of a solid-state image pickup device, as well as adaptively correct pixel by pixel the deterioration of spatial frequency components involved in the electrical registration correction.

2. Description of the Prior Art

As is known, registration errors of a solid-state image pickup device can arise if the relative positions of two or more images among red, green and blue images or portions thereof do not match each other.

Such a registration error of a solid-state image pickup device arises from a mounting error of pickup elements of red, green and blue, and chromatic aberration of an optical lens system. Although the mounting of pickup elements is performed by using a very precise jig, perfect obviation of the registration error is almost impossible.

Furthermore, since the registration error of the solid-state image device is determined by the mounting accuracy, dynamic registration correction in response to the chromatic aberration due to the dynamic change of magnification of lenses cannot be achieved.

In practice, however, use of a zoom lens can arise registration errors owing to the chromatic aberration of the lens produced as the zoom angle is altered. This will greatly deteriorates the quality of the composite output signal of the camera.

SUMMARY OF THE INVENTION

It is therefore a first object of the present invention to provide a registration circuit and method that can perform the dynamic and static registration correction in real time: the dynamic correction is carried out against the dynamic change such as the variation in chromatic aberration due to the change in magnification of a lens system; and the static correction is performed against the mounting errors of the solid sate image pickup elements.

A second object of the present invention is to provide a contour correction circuit that can reduce blurs resulting from the registration correction, thereby improving the quality of images. The registration correction is carried out by interpolation calculations between the neighboring pixels by using different coefficients for respective pixels to coincide the images having registration errors.

A third object of the present invention is to provide a contour correction circuit that can adaptively correct, pixel by pixel, contours of an image on real time basis according to the interpolation coefficients for respective pixels.

In a first aspect of the present invention, there is provided a registration correction circuit for a solid-state camera having a plurality of solid-state image pickup elements each of which produces a color video signal of an image in the form of pixel data, the registration correction circuit, which corrects registration errors between the image pickup elements, comprising: first storing means for storing a plurality of color video signals produced from the solid-state image pickup elements in the form of pixel data; second storing means for storing registration correction data predetermined corresponding to the registration errors of the respective image pickup elements; generating means for producing address data of the first storing means and interpolation coefficients according to the registration correction data in synchronism with one of the color video signals selected as a reference signal; coordinate transformation means for moving pixels by a multiple of 1-pixel pitch in real time by reading from or writing to the first storing means the pixel data in accordance with the address data; and interpolation means for performing interpolation calculations on the pixel data by using the interpolation coefficients, and for moving the pixel data by the amount less than 1-pixel pitch, wherein the pixel data of the color video signals other than the reference signal are moved so that the pixel data of all the color video signals will agree in their positions.

It is preferable that the interpolation means perform infield interpolation for motion images and inframe interpolations for still images.

Furthermore, it is possible for the coordinate transformation means to prepare a plurality sets of correction waveform data in advance, and to selectively use one set of the correction waveform data to handle the change of an optical lens system, or the change in chromatic aberration due to the change in zoom ratios of a zoom lens.

In a second aspect of the present invention, there is provided a contour correction circuit for a solid-state camera having a plurality of solid-state image pickup elements each of which produces a color video signal in the form of pixel data, the contour correction circuit comprising: first storing means for storing a plurality of color video signals produced from the solid-state image pickup elements in the form of pixel data; second storing means for storing registration correction data predetermined corresponding to the registration errors of the respective image pickup elements; generating means for producing address data of the first storing means and interpolation coefficients according to the registration correction data in synchronism with one of the color video signals selected as a reference signal; coordinate transformation means for moving pixels by a multiple of 1-pixel pitch in real time by reading from or writing to the first storing means the pixel data in accordance with the address data; interpolation means for performing interpolation calculations on the pixel data by using the interpolation coefficients, and for moving the pixel data by the amount less than 1-pixel pitch; means for generating contour correction signals from the reference signal in accordance with the ratios of the interpolation coefficients; and means for adding the contour correction signals to the color video signals other than the reference signal, wherein spatial frequency components reduced by the interpolation calculations are adaptively compensated for each pixel in real time.

In a third aspect of the present invention, there is provided a registration correction method for a solid-state camera having a plurality of solid-state image pickup elements each of which produces a color video signal of an image in the form of pixel data, the registration correction method comprising the steps of: prestoring registration correction data predetermined corresponding to the registration errors of the image pickup elements; storing a plurality of color video signals produced from the solid-state image pickup elements in the form of pixel data; generating address data and interpolation coefficients according to the registration correction data in synchronism with one of the color video signals selected as a reference signal; moving the pixel data by a multiple of 1-pixel pitch in real time by changing reading addresses or writing addresses of the pixel data in accordance with the address data; and performing interpolation calculations on the pixel data by using the interpolation coefficients so as to move the pixel data less than the 1-pixel pitch, wherein the pixel data of the color video signals other than the reference signal are moved so that the pixel data of all the color video signals will agree in their positions.

In a fourth aspect of the present invention, there is provided a contour correction method for a solid-state camera having a plurality of solid-state image pickup elements each of which produces a color video signal in the form of pixel data, the contour correction method comprising the steps of: prestoring registration correction data predetermined corresponding to the registration errors of the image pickup elements; storing a plurality of color video signals produced from the solid-state image pickup elements in the form of pixel data; generating address data and interpolation coefficients according to the registration correction data in synchronism with one of the color video signals selected as a reference signal; moving the pixel data by a multiple of 1-pixel pitch in real time by changing reading addresses or writing addresses of the pixel data in accordance with the address data; performing interpolation calculations on the pixel data by using the interpolation coefficients so as to move the pixel data less than the 1-pixel pitch, generating contour correction signals from the reference signal in accordance with the ratios of the interpolation coefficients; and adding the contour correction signals to the color video signals other than the reference signal, wherein spatial frequency components reduced by the interpolation calculations are adaptively compensated for each pixel in real time.

In a color television camera having a plurality of (three in general) solid-state image pickup elements, the positional relationship of an optical lens system of the camera and each image signal produced from the image pickup elements in the form of pixel data may differ each other owing to the structural problem or the like. This is called registration errors. The present invention corrects the registration errors as follows: first one image signal is selected as a reference signal; second, the other image signals on a random access memory or the like are shifted by using coordinate transformation and interpolation between the pixels so that the positional relationship between the optical lens system and the image signals other than the reference signal will agree to that of the reference signal.

In this case, the address transformation of the random access memory and the interpolation calculations to shift the pixels can be performed by using correction data prepared for each pixel and prestored in a memory. To accomplish this, however, enormous capacity of memory is required because correction information must be stored for each pixels. In like of this, the present invention digitally generates waveforms such as sawtooth waveforms and parabolic waveforms as in conventional analog image pickup tubes which use these waveforms to control the deflection systems of the tubes, and then controls the mixing ratios of respective waveforms independently by the predetermined and prestored values.

Thus, in the process of the coordinate transformation and interpolation of the pixels of the present invention, the correction waveform data can be freely controlled by multiplying the waveforms such as DC, SAWTOOTH, PARABOLIC by the correction coefficients for controlling the amplitudes of these waveforms.

Furthermore, in the interpolation process of the pixels in an interlaced scanned system, the infield interpolation and the inframe interpolation can be selectively used: the infield interpolation is preferable for the motion images; and the inframe interpolation is preferable for the still images.

A plurality sets of coefficients prepared in advance can be selectively used to handle the change of an optical lens system, or the change of chromatic aberration due to the change in zoom ratios of a zoom lens.

The interpolation coefficients used in the registration correction of the present invention are supplied on a feedforward basis from a coefficient generator or the like. This means that the portions of an image to be subjected to the interpolation, and the manner in which the interpolation is performed are determined in advance. This further means that the location and degree of the deterioration of the spatial frequency characteristics are determined beforehand.

In addition, every part of an object picked up is supposed to take exactly the same positions in the interpolated video signals and in the reference signal because the pixels of the interpolated signals are shifted so that they will agree with their counterparts of the reference signal by the registration correction means.

This makes it possible to restore the video signals having frequency characteristics similar to those of the original video signals before the interpolation: the interpolation coefficients and for the interpolation are converted into correction coefficients that make it possible to extract the frequency components supposed to be lost by the interpolation when the reference signal is multiplied by the correction coefficients; and the frequency components thus extracted are used as correction signals to compensate the degradation in the frequency characteristics due to the interpolation.

Similar processing can be carried out in an interlaced scanning system in which the interpolation calculations can be switched between the inframe and infield modes in response to the detection signal of a motion detector. In this case, the detection signal is simultaneously supplied to a circuit for producing the correction signal and a circuit for correcting the video signals by using the correction signal.

The operation and effect of the present invention can be summarized as follows.

(1) By electronically correcting the chromatic aberration due to the change of magnification of an optical lens system, the degradation of resolution of a solid-state image pickup camera at its composite output side can be ideally corrected.

(2) Since the correction is achieved in real time mode, dynamic correction, for example, in accordance with the zoom angle of a zoom lens can be performed.

(3) Registration errors owing to mounting position errors of solid-state pickup elements can be corrected.

(4) Although the interpolation for correcting registration errors which is performed by using different interpolation coefficients depending on the registration errors results in blurs of pixels subjected to the interpolation. these blurs can be significantly reduced by using the interpolation coefficients. As a result, it is possible to configure an interpolation circuit that can achieve the resolution approximately equal to that of an image before the interpolation in the frequency domain of the luminance signal component.

(5) Portions of an image not subjected to the interpolation are by no means affected by the interpolation.

The above and other objects, effects, features and advantages of the present invention become more apparent from the following description of the embodiment thereof taken in conjunction with the accompanying drawings.

BRIEF DESCRIPTION OF THE DRAWINGS

FIGS. 7A–7C, 8A–8B, and 10A–10B are diagrams illustrating interpolation calculations using 4-neighboring pixels according to an embodiment of the present invention;

FIGS. 13A, 13B, 14 and 15A–15D are schematic diagrams illustrating the principle of the contour enhancement of the embodiment;

FIG. 16A and 16B are block diagrams showing the entire arrangement of the embodiment of the present invention.

DETAILED DESCRIPTION OF PREFERRED EMBODIMENTS

The invention will now be described with reference to the accompanying drawings.

The present invention is carried out on the assumption that a solid-state image pickup device is used. To simplify the explanation, however, general description of the registration will be given with reference to various deflection waveforms applied to a conventional image pickup tube.

Figure 1B:
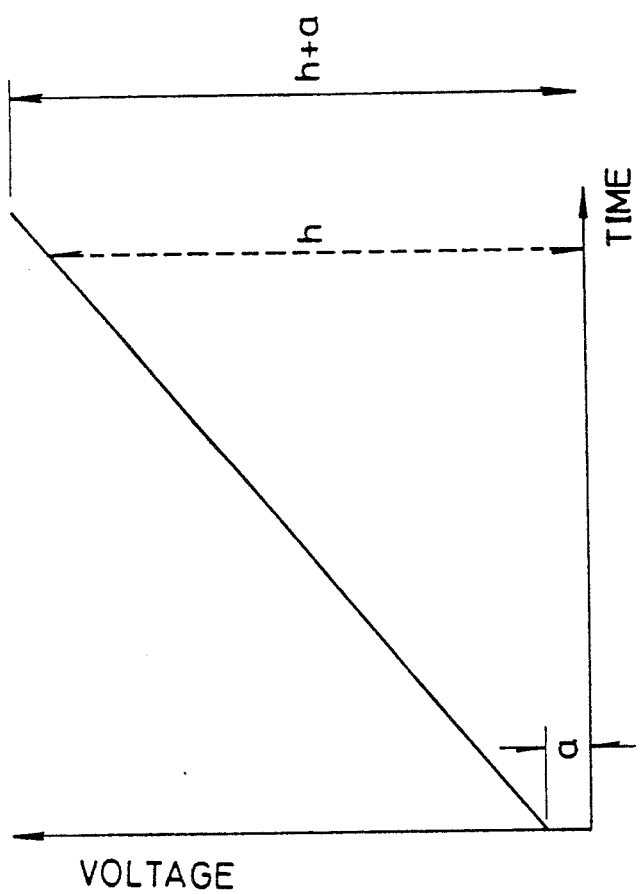
FIGS. 1A, 1B, 2A, 2B, 3A, 3B, 4A–4D and 5A to 5H are schematic diagrams illustrating a conventional registration error correction method performed in an image pickup tube.
Figure 1A:
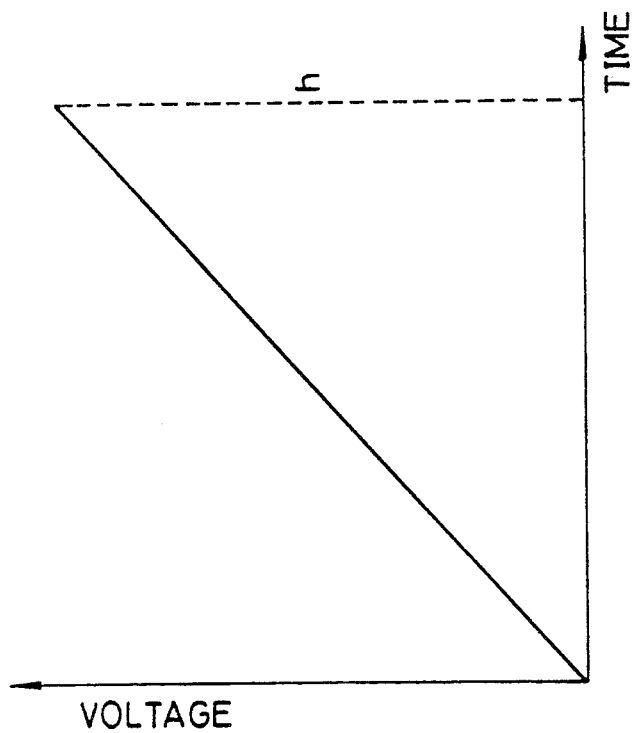

FIG. 1A illustrates a deflection waveform of an image pickup tube. The deflection waveform has a sawtooth waveform. Its amplitude h corresponds to the rightmost edge of a screen in the case of horizontal deflection, whereas it corresponds to the bottom of the screen in the case of vertical deflection.

Superimposing a constant direct current (DC) component of FIG. 1B to the deflection waveform of FIG. 1A enables the image pickup tube to change the centering, thus performing the parallel shift of the image.

Figure 2B:
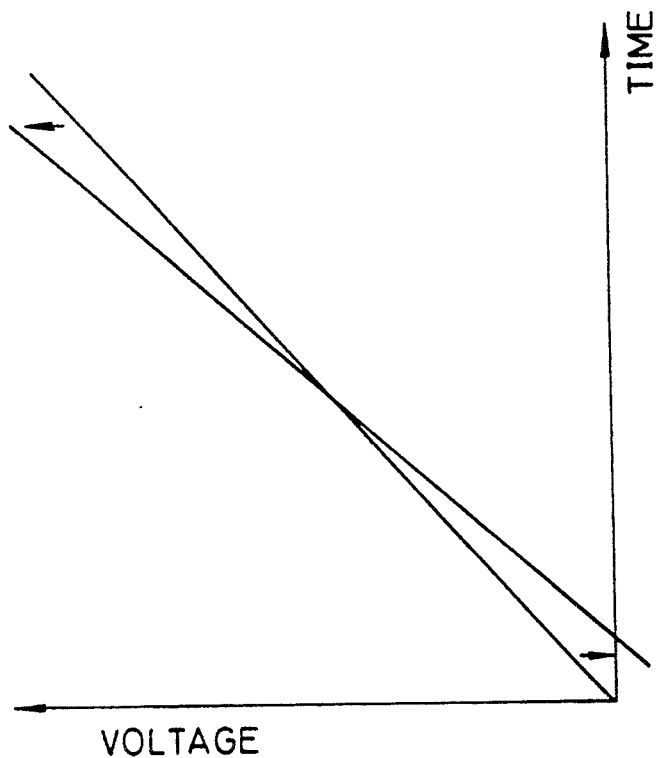
Figure 2A:
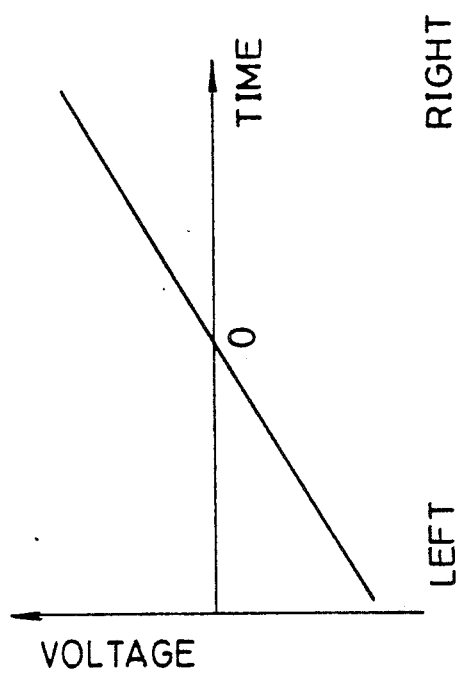

Superimposing a sawtooth waveform shown in FIG. 2A to the deflection waveform of FIG. 1A enables the image pickup tube to change the size of its image as shown in FIG. 2B.

Figure 3B:
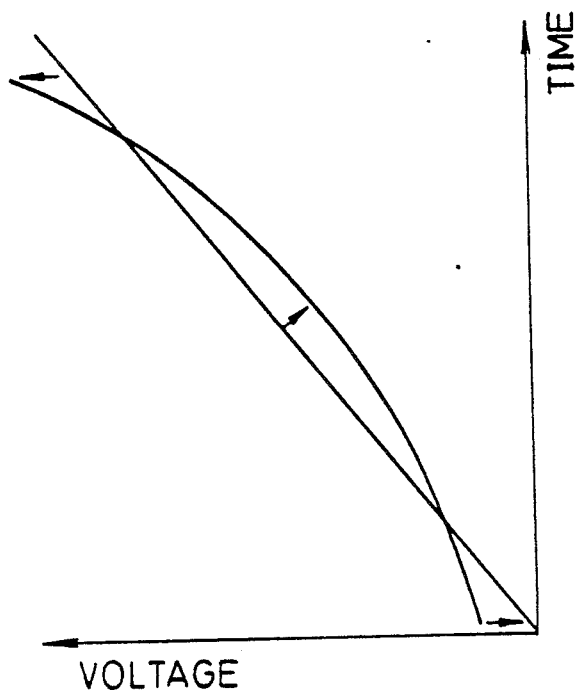
Figure 3A:
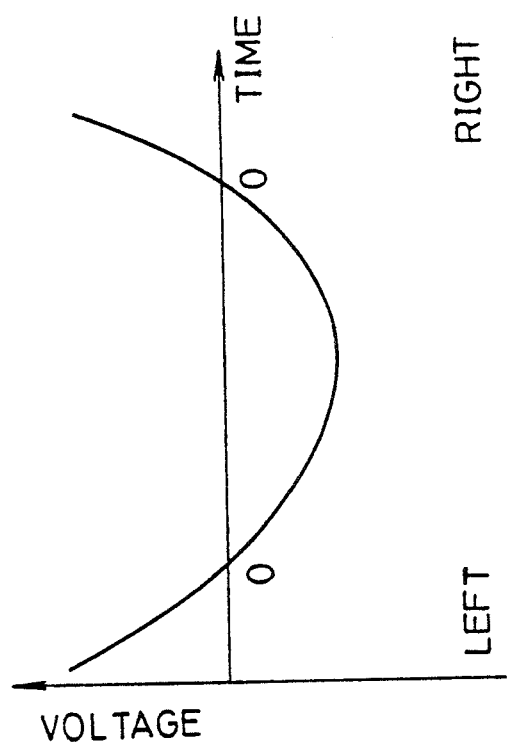
Figures 4A, 4B, 4C, 4D:
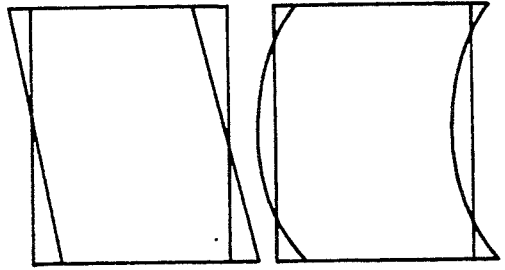
Figure 5A:
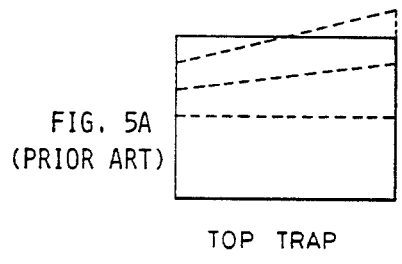
Figure 5B:
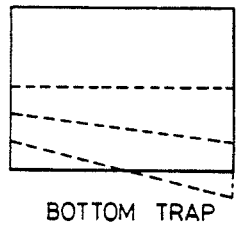
Figure 5C:
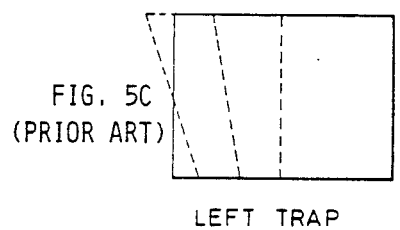
Figure 5D:
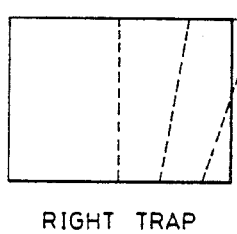
Figure 5E:
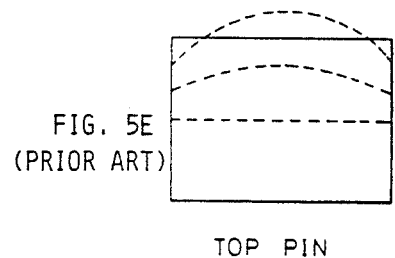
Figure 5F:
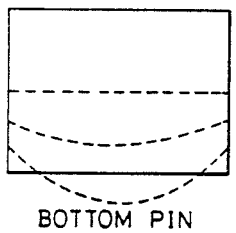
Figure 5G:
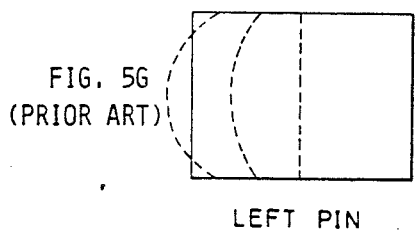
Figure 5H:
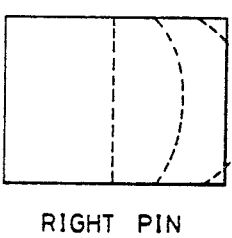

Similarly, by superimposing a parabolic waveform as shown in FIG. 3A to the deflection waveform of FIG. 1A, the linearity of an image can be changed as shown in FIG. 3B.

In addition, superimposing a sawtooth waveform or a parabolic waveform to the deflection waveform of the other deflection axis (for example, superimposing a vertical sawtooth waveform to the horizontal deflection waveform) enables the image pickup tube to correct SKEW, BOW, or ROTATION of the image as shown in FIGS. 4A–4D.

Likewise, geometric corrections such as TRAP or PIN can be achieved as shown in FIGS. 5A–5H.

Superimposing these waveforms to the deflection waveform will enable the image pickup device to correct the registration error. Thus, applying the above operations to the registration control of the present invention will be considered below. It is assumed that respective color component video signals are stored in frame memories or the like.

First, the above-mentioned centering technique is applied to the horizontal registration correction. In this case, a constant value (form example, a 12-bit digital value) is generated. The integer portion of the constant (for example, upper 4 bits) is used to control the horizontal address of the memory, and the fraction portion (for example, lower 8 bits) is used to control an interpolation coefficient which will be described later.

More specifically, when the constant value of $(380)_{16}$ is given, reading ot the horizontal address of all the pixels is delayed by the amount corresponding to the integer "3", i.e., 3 pixels, and the interpolating operation is performed between the two pixels, the third and fourth previous pixels, by using the value "80"=0.5 of the fraction portion. Thus, all the pixels of the original image is horizontally shifted by the amount of 3.5 pixels, thus shifting the original image by the same amount. Changing the value of the constant makes it possible to control the shift amount of an image. The shift direction, on the other hand, can be controlled by the sign bit MSB (Most Significant Bit). The vertical centering can be applied in a similar manner to the horizontal registration correction.

Next, let us consider the application of the above-mentioned size control technique. In this case, a sawtooth waveform which is specified, for example, by a 12-bit digital value, and the zero point of which is placed at the center of the screen is generated. The integer portion of the digital value (the upper 4 bits) is added to the read address of the memory to produce a new read address, and the fraction portion (the lower 8 bit) is used as an interpolation coefficient to more accurately control the size of the image.

Likewise, the above-mentioned linearity technique can be applied to the registration correction. In this case, a parabolic waveform which is specified, for example, by a 12-bit digital value is generated. The integer portion of the digital value (the upper 4 bits) is added to the read address of the memory to produce a new read address, and the fraction portion (the lower 8 bit) is used as an interpolation coefficient to more accurately control the linearity.

These waveforms are independently generated for the horizontal axis and the vertical axis, and are multiplied by the correction coefficients generated by a microcomputer, and the resultant products are added to produce horizontal correction waveform data and vertical correction waveform data. The correction coefficients can be controlled by using variable resistors and rotary encoders connected to the microcomputer: the variable resistors are manipulated to adjust the registration; and the rotary encoders inform the microcomputer of the values of the variable resistors.

The correction waveform data thus obtained are used to control the registration correction: the integer portion (the upper 4 bits) of the data is used to control the read address of the image data, and the fraction portion (the lower 8 bits) is used to control the interpolation coefficients.

Next, an embodiment of the present invention will be described in more detail with reference to FIGS. 6-17.

Figure 6:
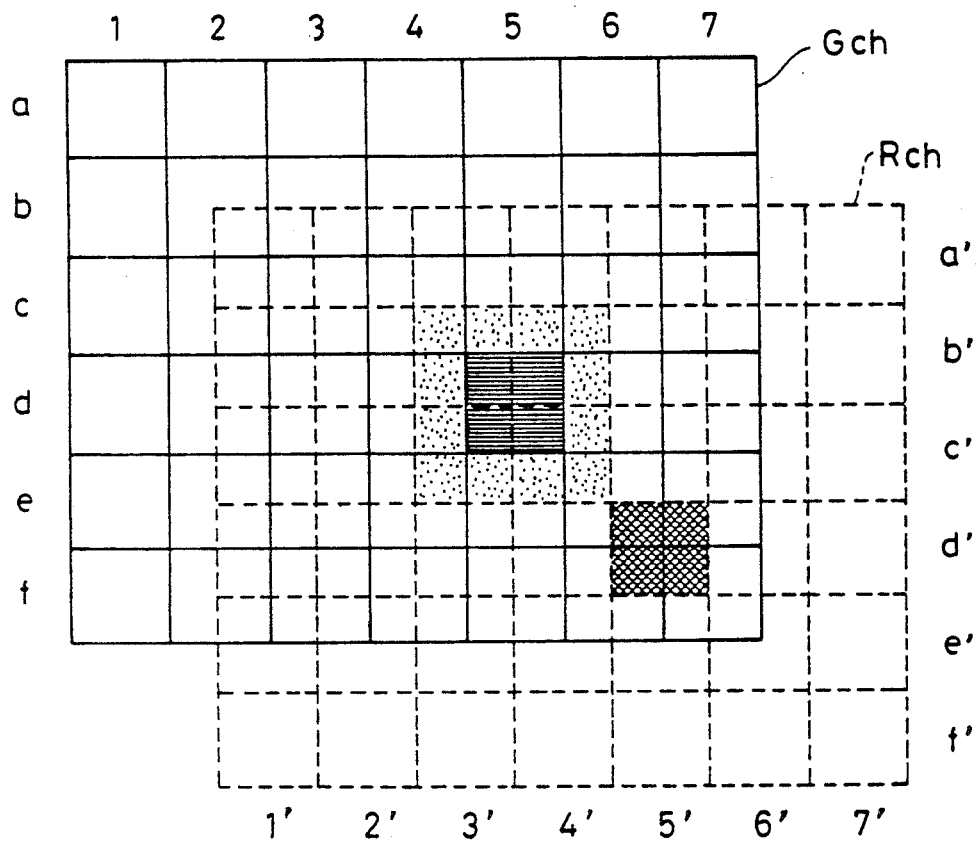
FIG. 6 is a schematic diagram illustrating an example of a registration error of a color image pickup device.

In FIG. 6, a red image R-ch does not agree with the green image G-ch which is specified as the reference image; a pixel (5, d) of the green image does not correspond to the pixel (5', d'), but corresponds to four pixels of the red image, (3', b'), (4', b'), (3', c') and (4', c'). This misregistration can be corrected by reading out the information of these addresses (3', b'), (4', b'), (3', c') and (4', c') of R-ch, and performing interpolation to these four pixels by multiplying the pixels by coefficients corresponding to the amount of registration errors. In this case, it is easily seen that misregistration occurs if the pixel (5', d') of the R-ch is read out with the corresponding pixel (5, d) of the G-ch.

Thus, in the embodiment of the present invention, interpolation calculations are performed by using four neighboring pixels.

For example, in the case where an impulse-like pixel shown in FIG. 7A having the level "1" at a part on an image is shifted to the right by m (0≦m≦1) pixel pitch, interpolation calculations are performed for respective 4-neighboring pixels by using coefficients shown in FIG. 7B, and the interpolation result shown in FIG. 7C can be obtained.

The above method can be extended to two dimensional registration shown in FIG. 8A. For example, when the horizontal registration error is m, and the vertical registration error is n, the interpolation coefficients a, b, c, d of the 4-neighboring pixels take values shown in FIG. 8B.

When the interlaced scanning is used, the following steps are taken.

Figure 9:
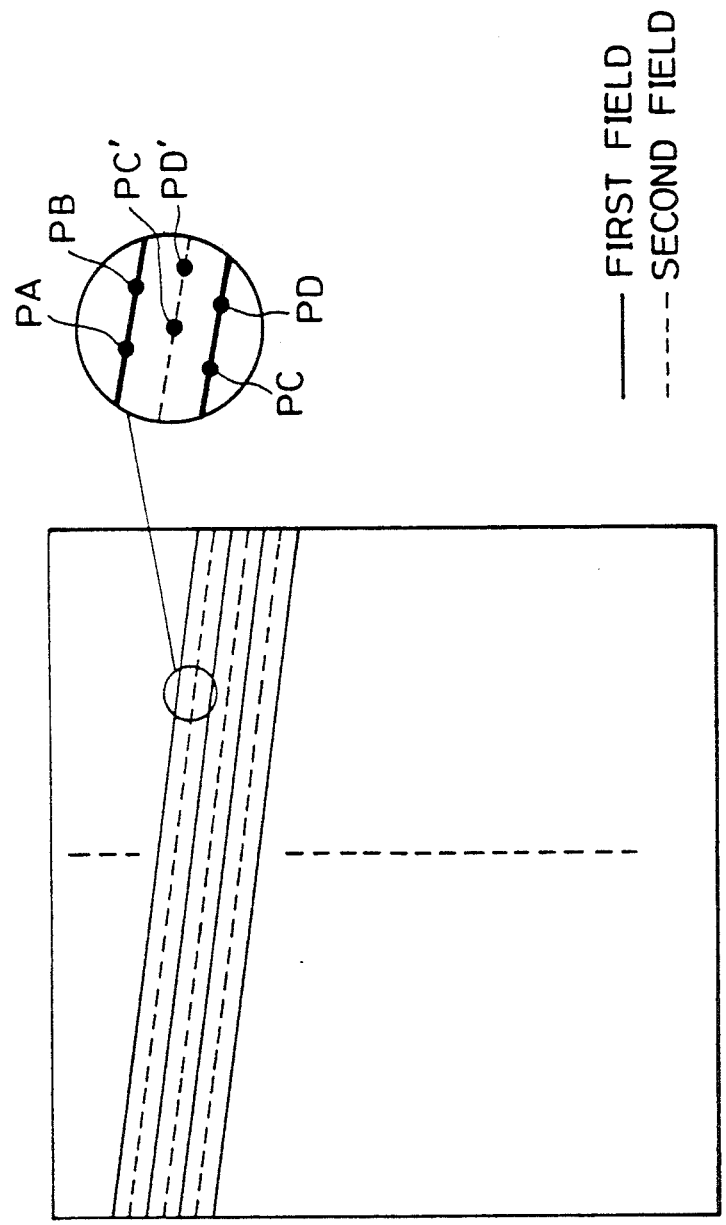
FIG. 9 is a schematic diagram illustrating 4-neighboring pixels when the interlaced scanning is carried out in the embodiment of the present invention.

In a system using an interlaced scanning, the neighboring pixels in the vertical direction belongs to different fields as shown in FIG. 9. In FIG. 9, pixels PA, PB, PC and PD belong to a first field, and pixels PC' and PD' belong to a second field. For this reason, it is necessary to switch the pixels between the inframe and infield depending on the movement of the image. The interpolation coefficients in this case take values shown in FIG. 10A: interpolation coefficients a, b, c and d in FIG. 10A corresponding to infield pixels PA, PB, PC and PD are used for moving images; and interpolation coefficents a'(=a), b'(=b), c' and d' corresponding to inframe pixels PA, PB, PC' and PD' are used for still images.

In the above registration correction processing, a new problem occurs. This will be described below.

When misregistered images are processed, the misregistration the amount of which is an integer multiplication of a pixel pitch, can be eliminated by physically shifting images by changing addresses of a random access memory or the like. In this case, the interpolation calculations are not required, and so the degradation of the frequency characteristics of the image does not occur.

In contrast with this, when the misregistration less than one pixel is corrected, the interpolation calculations described above is performed by using neighboring pixels. This poses a problem that the amplitude characteristics change in an image which has, for example, a single high-frequency component. This is because each pixel takes a different interpolation coefficient.

Figure 11:
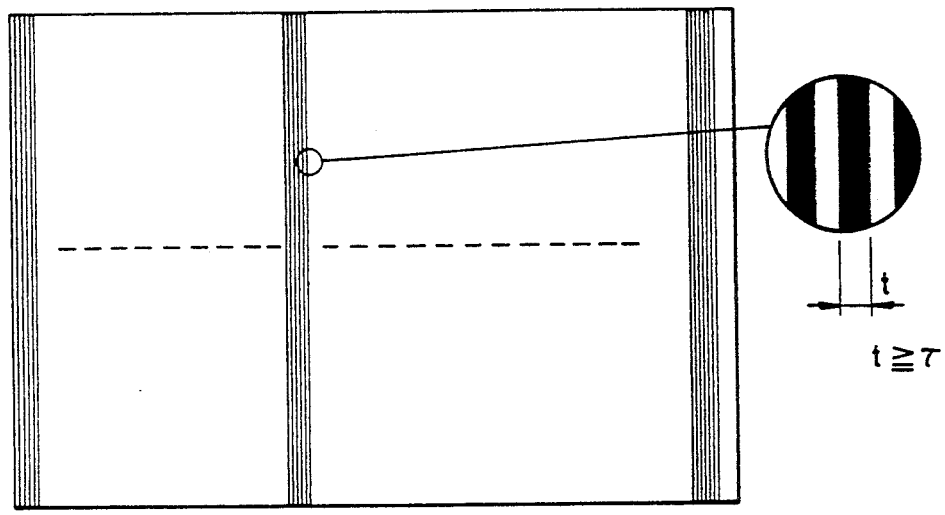
FIGS. 11 and 12 are schematic diagrams for explaining the degradation of spatial frequency characteristics owing to the interpolation of the embodiment.
Figure 12:
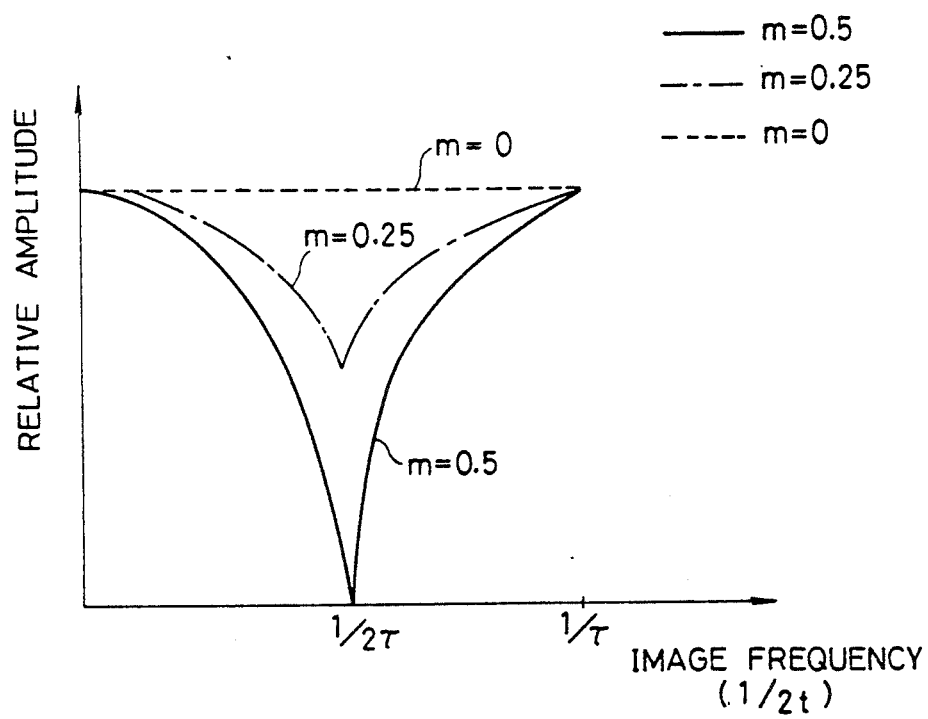

For example, consider the image shown in FIG. 11 consisting of black and white vertical stripes of a fixed interval t. When a portion of the image is shifted by m pixel pitch (0≦m≦1) in the right direction, the shifted portion and only this portion is subjected to the degradation in the spatial frequency characteristics of the image. FIG. 12 illustrates the degradation of the frequency characteristics. The degradation of the frequency characteristics exhibits a roll-off characteristic the maximum attenuation of which occurs at the spatial frequency of 1/(2τ), where τ is one pixel pitch. The degradation changes depending on the registration coefficient m, and the attenuation becomes maximum when the coefficient m=0.5 (½ pixel pitch). For example, the image illustrated in FIG. 11 takes a maximum frequency degradation when the pitch t=τ at which the coefficient m takes a value of 0.5.

Thus, the different interpolation coefficients will cause shading-like color irregularity in the image as shown in FIG. 11 which has a single frequency component over the entire image.

Furthermore, the interpolation calculations are also performed in the vertical direction. In particular, in a system using the interlaced scanning, since pixels of different fields are used in moving images, the color irregularity becomes a three dimensional phenomenon. The correction of such a phenomenon has not been achieved.

In light of this, the present invention is provided with a contour enhancement function for correcting the degradation of the spatial frequency characteristic of images. The principle of the contour correction will be described.

In FIG. 7A, let us assume that an impulse-like pixel having "1" level in an image is shifted in the right-hand direction by m (0≦m≦0.5) pixel pitch by using the linear interpolation. The interpolation calculations are performed for each pixel of the 4-neighboring pixels by using the interpolation coefficients of FIG. 7B, resulting in the pixels of levels shown in FIG. 7C.

The spatial frequency characteristic of the image converted as shown in FIG. 7C is illustrated in FIG. 13A. It exhibits a roll-off characteristic the maximum attenuation of which places at the spatial frequency of ½τ (τ=1 pixel pitch).

To correct this frequency characteristic, a reverse characteristic shown in FIG. 13B is used: the coefficients corresponding to the characteristic of FIG. 13B are shown in FIG. 14. These coefficients can be used to extract frequency components having the characteristic shown in FIG. 13B from an image. For example, the G-ch signal of FIG. 6 is selected as a reference signal, and is multiplied by these coefficients. Thus, the above-mentioned frequency component is extracted from the reference signal, because the registration errors between the interpolated signal (for example, R-ch signal of FIG. 6) and the reference signal are supposed to be canceled out by the interpolation, and so the interpolated pixels are assumed to agree to their counterparts of the reference signal. The extracted frequency components are added to the interpolated signal in order to eliminate blurs by the interpolation. This makes it possible to remarkably enhance a contour, especially that of the luminance signal.

The contour correction can be extended to a two-dimensional image. For example, when the horizontal registration error is m and the vertical registration error is n, the interpolation coefficients are given by FIGS. 8A and 8B. In this case, coefficients to be multiplied by the reference signal to correct blurs produced by the interpolation are given by FIGS. 15A-15D. These coefficients A-D are multiplied by the 4-neighboring pixels of the reference signal.

The contour correction is an interlaced scanning system is performed as follows.

In the interlaced scanning system, vertical neighboring pixels belong to different fields as shown in FIG. 9. Consequently, vertical neighboring pixels must be switched depending on an infield or inframe mode.

More specifically, the infield mode, which uses correction coefficients A, B, C and D in FIG. 10B corresponding to the interpolation coefficients a, b, c and d in FIG. 10A, respectively, is used for a motion image, that is, when the image correlation between fields is small. In contrast with this, the inframe mode, which uses correction coefficients A', B', C', and D' in FIG. 10B corresponding to interpolation coefficients a', b', c' and d' in FIG. 10A, respectively, is used for a still image, that is, when the correlation between fields is great. The movement of images is detected from the reference signal, and the two mode is switched in response to the detected result. In addition, when images change from motion to still images, the correction coefficients A, B, C and D, and the correction coefficients A', B', C' and D' are added at appropriate ratios so that transitions from the motion to still images are smoothed.

Thus, the frequency degradation resulting from the interpolation can be compensated by the contour correction using the correction coefficients that are adaptively determined in accordance with the interpolation coefficients associated with respective portions of the image. It is obvious that the frequency characteristics of pixels not subjected to the interpolation are not degraded.

Figure 16B:
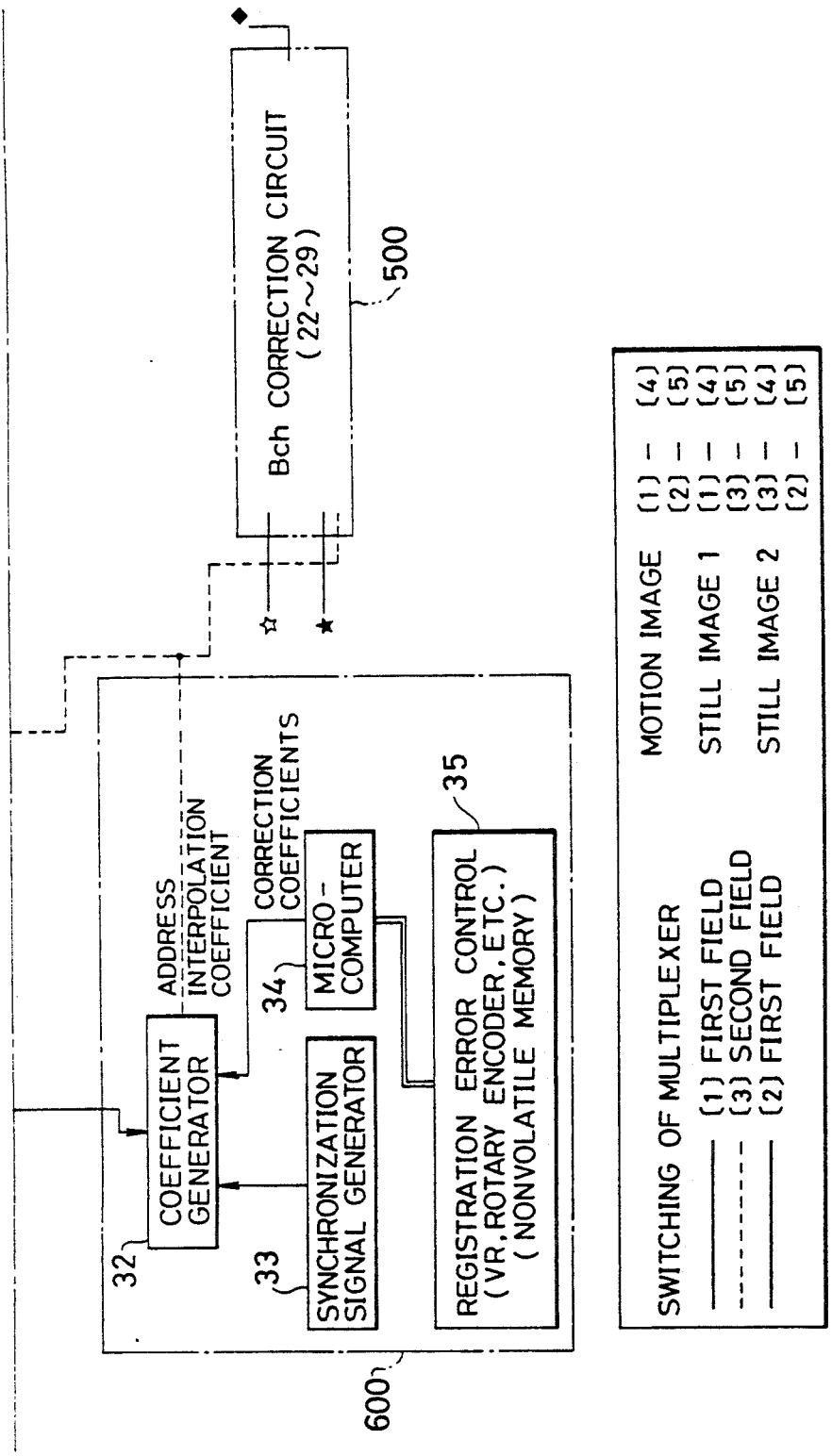

FIG. 16A and 16B are block diagrams showing the entire arrangement of an embodiment of a registration and contour correction circuit for a solid-state camera according to the present invention. This embodiment corrects the registration errors of a 3-original-color interlaced-scanning type solid-state image pickup device by electrically adjusting the red and blue channels so as to agree with the green channel selected as the reference signal. In addition, the embodiment enhances contours of an image by compensating the spatial frequency characteristics degraded by the interpolation for correcting the registration errors.

The circuit is divided into six large blocks: an R-channel registration signal generating circuit 100, a B-channel registration signal generating circuit 200, a reference signal processing circuit 300, an R-channel contour correction signal generating circuit 400, a B-channel contour correction signal generating circuit 500, and an interpolation coefficient control circuit 600. THe R-channel and B-channel registration signal generating circuits 100 and 200 have the same arrangement, and the R-channel and B-channel contour correction signal generating circuits 400 and 500 have the same arrangement.

The R-channel registration signal generating circuit 100 has a memory portion and an interpolation calculation portion. The memory portion is composed of two 1-field delay circuits 1 and 2, two 1-line delay circuits 3 and 3', three random access memories (RAMs) 4, 5 and 6, and a multiplexer 7. The interpolation calculation portion is composed of two 1-pixel delay circuits 8 and 9, four coefficient circuits (multipliers) 10, 11, 12 and 13, and an adder 14.

The reference signal processing circuit 300 is composed of two 1-field delay circuits 15 and 16, two 1-line delay circuits 17 and 17', three n-line delay circuits (n=time delay of RAMs 4, 5 and 6) 18, 19 and 20, a multiplexer 21, and a motion detector 31.

The R-channel contour correction signal generating circuit 400 is composed of two 1-pixel delay circuits 22 and 23, coefficient converter 24, four coefficient circuits (multipliers) 25, 26, 27 and 28, and an adder 29.

The interpolation coefficient control circuit 600 is composed of coefficient generator 32, synchronizing signal generator 33, microcomputer 34, and registration error controller 35.

The registration errors are corrected by shifting the R-channel and B-channel signals so that these signals coincide with G-channel signal specified as the reference signal. In this case, the registration errors integer multiple of 1-pixel pitch can be corrected by a coordinate transformation using the RAMs 4, 5, and 6, and the registration errors less than 1-pixel pitch can be corrected by the interpolation using 4-neighboring pixels as described before.

More specifically, the R-channel (B-channel) input signal is transmitted through the two 1-field delay circuits 1 and 2, one 1-line delay circuit 3. Thus, the input signal is delayed by 1 frame +1 line, and this signal (signal [1] of FIG. 16A) is used as a reference of timing. A signal of the next field (signal [3] of FIG. 16A), and a signal of next line (signal [2] of FIG. 16A) are also produced. These signals are switched depending on the signal generated from the motion detector 31: when the input image is a motion image, the multiplexer 7 operates in the infield mode, and produces signals of the adjacent lines of the same field, i.e., signals [1] and [2], as the output signals [4] and [5]; when the input image is a still image, the multiplexer 7 operates in the inframe mode, and produces signals of adjacent lines of the same frame, i.e., signals [1] and [3] (or signals [3] and [2]), as the output signals [4] and [5] as shown in FIG. 16A (see FIG. 9 also).

The RAMs 4, 5 and 6 perform the coordinate transformation by having addresses thereof controlled by the integer portion of the coefficient supplied from the coefficient generator 32, thereby to correct the registration errors the amount of which is a multiple of 1-pixel pitch.

On the other hand, a registration error less than a pixel pitch can be corrected by the above-described interpolation calculations between 4-neighboring pixels carried out by the registration signal generating circuit 100. In this case, the coefficient circuits 10-13 use the fraction portion of the interpolation coefficients fed from the coefficient generator 32.

Figure 17:
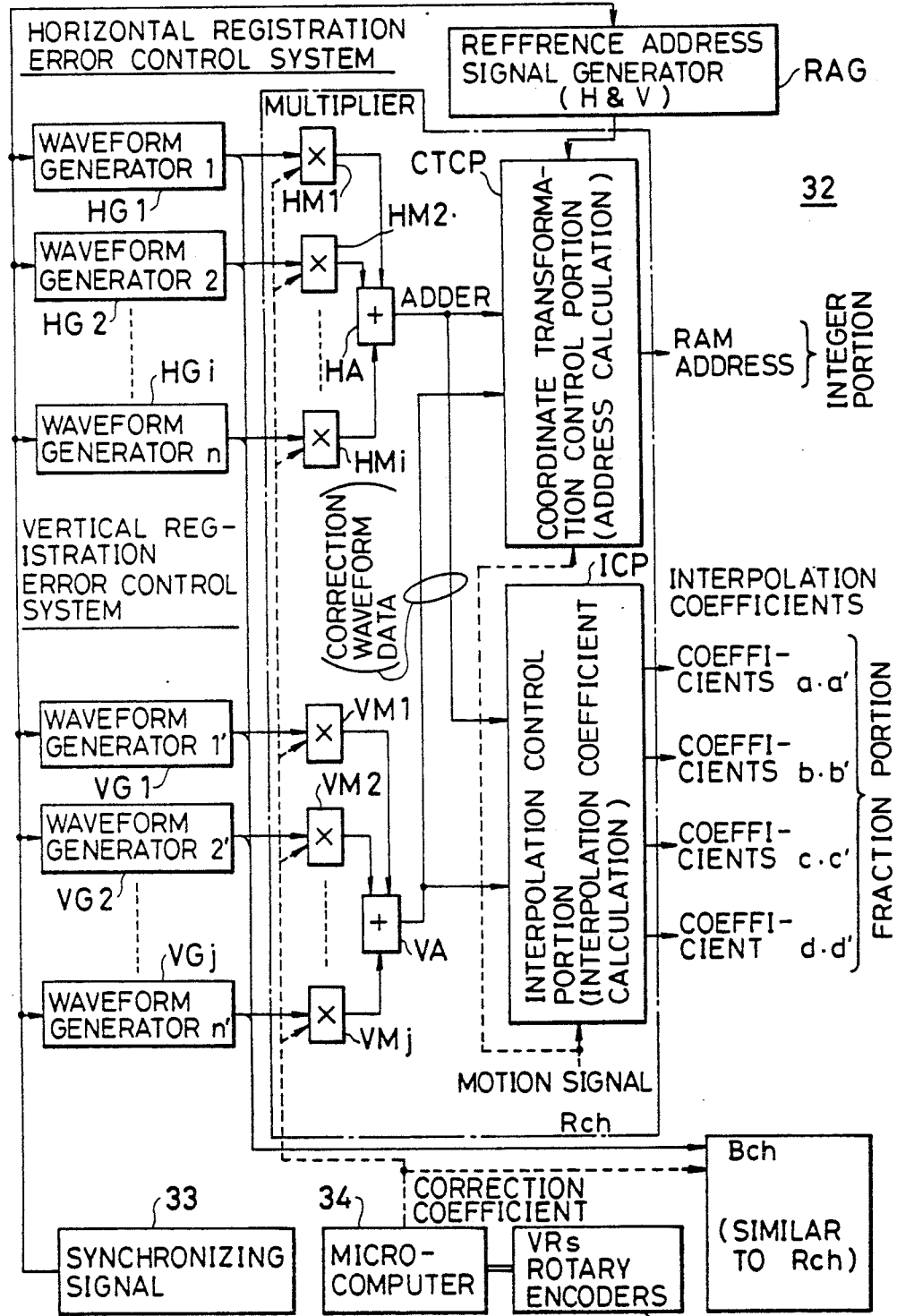
FIG. 17 is a block diagram showing a detailed arrangement of a coefficient generator of FIG. 16B.

FIG. 17 shows the detailed arrangement of the coefficient generator 32 together with the circuits connected thereto. The coefficient generator 32 comprises a horizontal registration error control system and a vertical registration error control system. The horizontal registration error control system includes a plurality of waveform generators HG1–HGi for generating predetermined correction signals, multipliers HM1–HMi for controlling the correction amounts, and an adder HA for summing up the outputs of the multipliers HM1–HMi. Likewise, the vertical registration error control system includes a plurality of waveform generators VG1–VGj for generating predetermined correction signals, multipliers VM1–VMj for controlling the correction amounts, and an adder VA for summing up the outputs of the multipliers VM1–VMj.

These waveforms are digitally generated, and the upper n bits of the waveforms define the integer portion, while the lower m bits of which define the fraction portion. The waveforms thus generated are fed to the multipliers HM1–HMi, and VG1–VGj, respectively, so that their mixing ratios are controlled by signals from the microcomputer 34. The outputs of the multipliers HM1–HMi, and VM1–VMj are summed up by the adders HA and VA, respectively.

The data specifying the mixing ratios of the waveforms produced from the waveform generators are predetermined by actually picking up a test chart, manually adjusting the images by controlling the variable resistors of the registration error controller 35 so that the registration errors are canceled, calculating, by the microcomputer 34, the adjusting amounts of the variable resistors on the basis of the outputs from the rotary encoders coupled to the respective raviable resistors, and storing the adjusting results in a memory of the microcomputer 34.

The summed up data produced from the horizontal adder HA and the vertical adder VA are fed to a coordinate transformation control portion CTCP for calculating the address of the RAMS 4–6, and an interpolation control portion ICP for calculating the interpolation coefficients. The coordinate transformation control portion CTCP produces address data of the RAMs 4–6 by adding the integer portion of the summed up data and the horizontal and vertical address reference data from a reference address signal generator RAG, while the interpolation control portion ICP produces the four interpolation coefficients for 4-neighboring pixels by using the fraction portion of the summed up data. In this case, the addresses and the interpolation coefficients are switched between those for infieldmode pixels and in-frame-mode pixels according to the motion signal as described above.

Each of the waveform generators HG1–HGi (or VG1–VGj) generates a different waveform such as follows.

DC (Direct Current) WAVEFORM $y = a$ (where a is a fixed value)

SAWTOOTH WAVEFORM (Horizontal Direction)

$y = ax + b$

PARABOLIC WAVEFORM (Horizontal Direction)

$Y = (x-b)^2 + c$

SAWTOOTH WAVEFORM (Vertical Direction)

$x = ay + b$

PARABOLIC WAVEFORM (Vertical Direction)

$x = (y-b)^2 + c$

Thus, the registration errors are corrected: the registration errors the amount of which is a multiple of 1-pixel pitch can be corrected by using the coordinate transformation on the RAMs 4–6 which is performed on the R-channel and B-channel signals with reference to the G-channel signal specified as the reference signal; and the registration errors the amount of which includes a component less than a pixel can be corrected by the interpolation ca.culations using the 4-neighboring pixels.

Although the correction of the registration errors of a multiple of 1-pixel pitch which is performed by the coordinate transformation produces no effect on the frequency characteristics of the video signals, the registration errors including errors less than a pixel, such as that of 0.5 pixel or 1.3 pixels, exhibits frequency degradation because of the interpolation calculations.

The frequency degradation can be compensated as follows.

As shown in FIG. 16A, the G-channel signal specified as the reference signal is handled in a manner similar to the R-channel and G-channel signals. The input G-channel signal is transmitted through the two 1-field delay circuits 15 and 16, one 1-line delay circuit 17. Thus, a reference signal delayed by 1 frame + 1line than the input signal is produced. In addition, a signal delayed by 1-field than the reference signal and a signal delayed by 1-line than the reference signal are produced from the 1-line delay circuit 17' and the 1-field delay circuit 16, respectively. The signal of 1-field delay and the signal of 1-line delay are switched by the multiplexer 21 in response to the motion signal generated from the motion detector 31: when the motion signal indicates a still image, the signal of 1-field delay is produced from the multiplexer 21, whereas when the motion signal indicates a motion image, the signal of 1-line delay is produced from the multiplexer 21. The signal thus obtained and the signal of 1-field and 1-line delay is transmitted through the 1-pixel delay circuits 22 and 23, respectively. Thus, the 4-neighboring pixels are obtained (see FIG. 9).

Since the R-channel and B-channel signals exhibit registration errors in the positive direction of vertical axis, the G-channel signal must be delayed by n-lines with regard to the R-channel and B-channel signals. The n-line delay circuits 18–20 are used for this purpose.

The 4-neighboring pixels thus obtained are fed to the coefficient circuits 25–28. The coefficient circuits 25–28 multiply the 4-neighboring pixels by the correction coefficients A–D or A'–D' supplied from the coefficient converter 24, respectively. The coefficient converter 24 converts the fraction portions of the interpolation coefficients a–d or a'–d' fed from the coefficient generator 32 into the correction coefficients A–D, or A'–D', which exhibit the inverse characteristics of those of the interpolation coefficients a–d, or a'–d', and supplies them to the coefficients circuits 25–28 in real time. The outputs of the coefficient circuits 25–28 are summed up by the adder 29.

The relationship between the interpolation coefficients a–d or a'–d' and the correction coefficients A–D or A'–D' is shown in FIGS. 15A–15D, and each of these coefficients corresponds to one of the 4-neighboring pixels.

The correction signal produced from the adder 29 is supplied to an adder 30 which adds the correction signal to the R-channel signal. An adder 30' performs similar addition with regard to the B-channel signal.

Although a specific embodiment of a registration and contour correction circuit and method for a solid-state camera constructed in accordance with the present invention has been disclosed, it is not intended that the invention be restricted to either the specific configurations or the uses disclosed herein. Modifications may be made in a manner obvious to those skilled in the art. For example, although in the above embodiment, the coordination transformation and the interpolation calculations for correcting the registration errors are performed at the read out side of the memory (RAMS), they can be performed at the write side of the memory by similar circuits. Furthermore, each of the multiplexers 7 and 21 can be replaced by an adaptive adding circuit that mixes the calculation results of the infield and inframe calculation results at particular ratios. This makes it possible to smooth transitions from motion to still images or from still to motion images.

Accordingly, it is intended that the invention be limited only by the scope of the appended claims.

What is claimed is:

1. A registration correction circuit for a solid-state camera having a plurality of solid-state image pickup elements each of which produces a color video signal of an image in the form of pixel data, said registration correction circuit, which corrects registration errors between the image pickup elements, comprising:
    first storing means for storing a plurality of color video signals produced from the solid-state image pickup elements in the form of pixel data;
    second storing means for storing registration correction data predetermined corresponding to the registration errors of the respective image pickup elements;
    generating means for producing address data of the first storing means and interpolation coefficients according to the registration correction data in synchronism with one of the color video signals selected as a reference signal;
    coordinate transformation means for moving pixels by a multiple of 1-pixel pitch in real time by reading from or writing to the first storing means the pixel data in accordance with the address data; and
    interpolation means for performing interpolation calculations on the pixel data by using the interpolation coefficients, and for moving the pixel data by the amount less than 1-pixel pitch,
    wherein the pixel data of the color video signals other than the reference signal are moved so that the pixel data of all the color video signals will agree in their positions.

2. A registration correction circuit for a solid-state camera as claimed in claim 1, wherein said generating means comprises means for generating correction waveform data by using the registration correction data in synchronism with the reference signal, and produces the address data and the interpolation coefficients from the correction waveform data.

3. A registration correction circuit for a solid-state camera as claimed in claim 2, wherein said means for generating correction waveform data includes a plurality of waveform generators for generating a plurality of predetermined waveforms, and amplitude control means for controlling the amplitudes of the waveforms with the registration correction data.

4. A registration correction circuit for a solid-state camera as claimed in claim 3, wherein the means for generating correction waveform data produces waveform data for centering control, width control, height control, linearity control, skew control, rotation control, trap control or pin control of the images.

5. A registration correction circuit for a solid-state camera as claimed in claim 3, wherein said interpolation means successively selects a predetermined number of neighboring pixels, multiplies each of the neighboring pixels by one of the interpolation coefficients, and adds the resultant products, thereby to produce the registration corrected color video signals.

6. A registration correction circuit for a solid-state camera as claimed in claim 5, further comprising selecting means for switching the selection of the neighboring pixels either from the same field of the color video signals or from the same frame of the color video signals when the image pickup elements operate in an interlaced scanning, and wherein the interpolation means performs infield interpolation for motion images and inframe interpolations for still images.

7. A registration correction circuit for a solid-state camera as claimed in claim 3, wherein the means for generating the correction waveform data selectively produces the correction waveform data on the basis of one of a plurality sets of the registration correction data prestored in the second storing means so as to correct the chromatic aberration due to magnification change by altering zoom angles of a zoom lens, or the registration errors due to the change of a lens.

8. A registration correction circuit for a solid-state camera as claimed in claim 3, wherein the amplitude control means further comprises variable resistors and rotary encoders, and updates the registration correction data stored in the second storing means when the variable resistors are manually controlled.

9. A contour correction circuit for a solid-state camera having a plurality of solid-state image pickup elements each of which produces a color video signal in the form of pixel data, said contour correction circuit comprising:
    first storing means for storing a plurality of color video signals produced from the solid-state image pickup elements in the form of pixel data;
    second storing means for storing registration correction data predetermined corresponding to the registration errors of the respective image pickup elements;
    generating means for producing address data of the first storing means and interpolation coefficients according to the registration correction data in synchronism with one of the color video signals selected as a reference signal;
    coordinate transformation means for moving pixels by a multiple of 1-pixel pitch in real time by reading from or writing to the first storing means the pixel data in accordance with the address data;
    interpolation means for performing interpolation calculations on the pixel data by using the interpolation coefficients, and for moving the pixel data by the amount less than 1-pixel pitch;
    means for generating contour correction signals from the reference signal in accordance with the ratios of the interpolation coefficients; and means for adding the contour correction signals to the color video signals other than the reference signal, wherein spatial frequency components reduced by the interpolation calculations are adaptively compensated for each pixel in real time.

10. A contour correction circuit for a solid-state camera as claimed in claim 9, wherein said generating means comprises means for generating correction waveform data by using the registration correction data in synchronism with the reference signal, and produces the address data and the interpolation coefficients from the correction waveform data.

11. A contour correction circuit for a solid-state camera as claimed in claim 10, wherein said means for generating correction waveform data includes a plurality of waveform generators for generating a plurality of predetermined waveforms, and amplitude control means for controlling the amplitudes of the waveforms with the registration correction data.

12. A contour correction circuit for a solid-state camera as claimed in claim 11, wherein the means for generating correction waveform data produces waveform data for centering control, width control, height control, linearity control, skew control, rotation control, trap control or pin control of the images.

13. A contour correction circuit for a solid-state camera as claimed in claim 11, wherein said interpolation means successively selects a predetermined number of neighboring pixels, multiplies each of the neighboring pixels by one of the interpolation coefficients, and adds the resultant products, thereby to produce the registration corrected color video signals.

14. A contour correction circuit for a solid-state camera as claimed in claim 13, further comprising selecting means for switching the selection of the neighboring pixels either from the same field of the color video signals or from the same frame of the color video signals when the image pickup elements operate in an interlaced scanning, and wherein the interpolation means performs infield interpolation for motion images and inframe interpolations for still images.

15. A contour correction circuit for a solid-state camera as claimed in claim 11, wherein the means for generating the correction waveform data selectively produces the correction waveform data on the basis of one of a plurality sets of the registration correction data prestored in the second storing means so as to correct the chromatic aberration due to magnification change by altering zoom angles of a zoom lens, or the registration errors due to the change of a lens.

16. A contour correction circuit for a solid-state camera as claimed in claim 11, wherein the amplitude control means further comprises variable resistors and rotary encoders, and updates the registration correction data stored in the second storing means when the variable resistors are manually controlled.

17. A registration correction method for a solid-state camera having a plurality of solid-state image pickup elements each of which produces a color video signal of an image in the form of pixel data, said registration correction method comprising the steps of:

prestoring registration correction data predetermined corresponding to the registration errors of the image pickup elements;

storing a plurality of color video signals produced from the solid-state image pickup elements in the form of pixel data;

generating address data and interpolation coefficients according to the registration correction data in synchronism with one of the color video signals selected as a reference signal;

moving the pixel data by a multiple of 1-pixel pitch in real time by changing reading addresses or writing addresses of the pixel data in accordance with the address data; and performing interpolation calculations on the pixel data by using the interpolation coefficients so as to move the pixel data less than the 1-pixel pitch, wherein the pixel data of the color video signals other than the reference signal are moved so that the pixel data of all the color video signals will agree to their positions.

18. A contour correction method for a solid-state camera having a plurality of solid-state image pickup elements each of which produces a color video signal in the form of pixel data, said contour correction method comprising the steps of:

prestoring registration correction data predetermined corresponding to the registration errors of the image pickup elements;

storing a plurality of color video signals produced from the solid-state image pickup elements in the form of pixel data;

generating address data and interpolation coefficients according to the registration correction data in synchronism with one of the color video signals selected as a reference signal;

moving the pixel data by a multiple of 1-pixel pitch in real time by changing reading addresses or writing addresses of the pixel data in accordance with the address data;

performing interpolation calculations on the pixel data by using the interpolation coefficients so as to move the pixel data less than the 1-pixel pitch, generating contour correction signals from the reference signal in accordance with the ratios of the interpolation coeeficients; and adding the contour correction signals to the color video signals other than the reference signal, wherein spatial frequency components reduced by the interpolation calculations are adaptively compensated for each pixel in real time.

* * * * *